United States Patent
Sefcik et al.

(10) Patent No.: US 8,576,971 B2
(45) Date of Patent: Nov. 5, 2013

(54) LASER FUSION NEUTRON SOURCE EMPLOYING COMPRESSION WITH SHORT PULSE LASERS

(75) Inventors: Joseph A. Sefcik, Tracy, CA (US); Scott C. Wilks, Mountain View, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 500 days.

(21) Appl. No.: 12/766,782

(22) Filed: Apr. 23, 2010

(65) Prior Publication Data

US 2011/0261919 A1   Oct. 27, 2011

(51) Int. Cl.
*G21B 1/03* (2006.01)

(52) U.S. Cl.
USPC .......................................... 376/103; 376/102

(58) Field of Classification Search
USPC ........................................ 376/102, 103, 152
See application file for complete search history.

(56) References Cited

U.S. PATENT DOCUMENTS 6,678,351 B1 * 1/2004 Perry et al. ..................... 378/119

OTHER PUBLICATIONS

Eliezer, et al., "Direct-indirect drive, a new possibility for laser induced fusion" Physics Letters A, (1992).*
Lindl, J., "Inertial Confinement Fusion," (selections provided) 1998, Springer-Verlag New York, Inc.*
Tabak, et al., "Ignition and High Gain with Ultrapowerful Lasers," Phys. Plasmas 1 (5) 1994.*
Yamakawa, et al., "Ultrafast, Ultrahigh-peak, and High-Average Power Ti:Sapphire Laser System and Its Applications," IEEE Journal of Selected Topics in Quantum Electronics, 6 (5) 2000.*
Nagai, et al., "Fabrication of aerogel capsule, bromine-doped capsule, and modified gold cone in modified target for the Fast Ignition Realization Experiment (FIREX) Project," Nucl. Fusion 49 2009.*
Hatchett et al., "Electron, photon, and ion beams from the relativistic interation of Petawatt laser pulses with solid targets." Phys. Plasmas, v7 (5) May 2000.*
Perry, et al. "Hard x-ray production from high intensity laser solid interactions (invited)", Review of Scientific Instruments, Jan. 1999, vol. 70, Part II, pp. 265-269.*
Chen, et al., "Relativistic Positron Creation Using Ultraintense Short Pulse Lasers", Physical Review Letters, Mar. 13, 2009, 102, 105001-1 to 105001-4.*
Hatchett, et al., "Electron, photon, and ion beams from the relativistic interaction of Petawatt laser pulses with solid targets", Phys. Plasmas 7, 2076 (2000) doi: 10.1063/1.874030.*
Yamakawa, et al., "Ultrafast, Ultrahigh-Peak, and High-Average Power Ti:Sapphire Laser System and Its Applications", IEEE Journal of Selected Topics in Quantum Electronics, vol. 6, No. 4, Jul./Aug. 2000. pp. 658-675.*
Eliezer, et al., "Direct-indirect drive, a new possibility for laser induced fusion," Physics Letters A 116 (1992) 249-252.*

(Continued)

*Primary Examiner* — Jack W Keith
*Assistant Examiner* — Sean P Burke
(74) *Attorney, Agent, or Firm* — Kilpatrick Townsend & Stockton (57) ABSTRACT

A method and system for achieving fusion is provided. The method includes providing laser source that generates a laser beam and a target that includes a capsule embedded in the target and filled with DT gas. The laser beam is directed at the target. The laser beam helps create an electron beam within the target. The electron beam heats the capsule, the DT gas, and the area surrounding the capsule. At a certain point equilibrium is reached. At the equilibrium point, the capsule implodes and generates enough pressure on the DT gas to ignite the DT gas and fuse the DT gas nuclei.

20 Claims, 4 Drawing Sheets

(56) References Cited

OTHER PUBLICATIONS

Nagai, et al., "Fabrication of aerogel capsule, bromine-doped capsule, and modified gold cone in modified target for the Fast Ignition Realization Experiments (FIREX) Project," Nucl. Fusion 49 (2009) 095028 (9pp).*

Tabak, et al., "Ignition and high gain with ultrapowerful lasers," Phys. Plasmas 1 (5) May 1994 pp. 1626-1634.*

Lindl, "Inertial Confinement Fusion," Chapters 1 and 2 (c) 1998 Springer-Verlang New York, Inc. pp. 1-179.*

Perry, M.D., et al., "Hard x-ray production from high intensity laser solid interactions (invited)", Review of Scientific Instruments, Jan. 1999, vol. 70, Part II, pp. 265-269.

Chen, H., et al. "Relativistic Positron Creation Using Ultraintense Short Pulse Lasers", Physical Review Letters, Mar. 13, 2009, 102, 105001-1 to 105001-4.

* cited by examiner

LASER FUSION NEUTRON SOURCE EMPLOYING COMPRESSION WITH SHORT PULSE LASERS

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Nuclear fusion is the process by which multiple like-charged atomic nuclei join together to form a heavier nucleus. Nuclear fusion is usually accompanied by the release or absorption of energy. Large scale fusion processes, involving many atoms fusing at once, occur in matter that is in a plasma state. For example, the fusion of two nuclei with lower mass than iron generally releases energy, while the fusion of nuclei heavier than iron absorbs energy. In the simplest case of hydrogen fusion, two protons have to be brought close enough for their mutual electric repulsion to be overcome by the nuclear force. The fusion of the protons results in the release of energy.

Research into controlled fusion, with the aim of producing fusion power for the production of electricity, has been conducted for over 50 years. It takes considerable energy to force nuclei to fuse, even those of the lightest element, hydrogen. This is because all nuclei have a positive charge due to their protons and since like charges repel, nuclei strongly resist being put too close together. When accelerated to high speeds, e.g., heated to thermonuclear temperatures, the nuclei can overcome this electromagnetic repulsion and get close enough for the attractive nuclear force to be sufficiently strong to achieve fusion. The fusion of lighter nuclei, which creates a heavier nucleus and a free neutron, generally releases more energy than it takes to force the nuclei together. This is an exothermic process that can produce self-sustaining reactions. At short distances, the attractive nuclear force is stronger than the repulsive electrostatic force. Therefore, if two nuclei are brought sufficiently close to each other, the likelihood that they will fuse together increases significantly. However, the main technical difficulty in achieving fusion is getting the nuclei close enough to fuse.

What is needed is a more repeatable and controllable process of achieving fusion.

SUMMARY OF THE INVENTION

Embodiments of the present invention generally provide a method and system for achieving nuclear fusion.

In an embodiment of the present invention, a method for achieving nuclear fusion is provided. The method includes providing a laser source operable to produce a laser beam, providing a target having a laser beam incidence region and including a capsule filled with deuterium-tritium (DT) gas, directing the laser beam towards the laser incidence region of the target, generating a plurality of electrons in the laser incidence region and directed along an electron path towards the capsule, heating the capsule, the DT gas, and a region of the target surrounding the capsule to a first temperature, compressing the capsule, generating a first pressure on the DT gas, igniting the DT gas, and fusing the DT gas nuclei.

In another embodiment of the present invention, a system for performing nuclear fusion is provided. The system comprises a laser source adapted to provide a laser beam directed along an optical path and having laser energy, and a target positioned along the optical path. The target comprises a laser incidence area for receiving the laser beam, an electron generation region adapted to absorb a portion of the laser energy associated with the laser beam and generate a plurality of electrons along an electron path, a compression region disposed along the electron path, and a capsule embedded within the compression region and including deuterium-tritium (DT) gas.

Yet other embodiment of the present invention provides a method for generating neutrons. The method comprises providing a target having a front surface and a back surface, the target including a capsule containing deuterium-tritium (DT) gas, directing a laser beam towards the target such that the laser beam is incident on the front surface, generating an electron beam in a region near the front surface, wherein the electron beam includes a plurality of electrons, heating the capsule and the DT gas to a first temperature, igniting the DT gas, and generating neutrons as a result of the ignition.

Many benefits are realized by embodiments of the present invention. By using the a specially designed target, the electrons beam having sufficient current and beam density can be generated within the target and close to the capsule comprising the DT gas. By using a combination of high-Z material and low-Z materials, the target may be designed such that compression of the fuel in the capsule can be achieved at lower temperature. This technique also enables the laser to be pointed directly at the target as opposed to using lasers to heat a radiation hohlraum. This greatly simplifies the laser control and operation methods.

The following detailed description, together with the accompanying drawings will provide a better understanding of the nature and advantages of the embodiments of the present invention.

DETAILED DESCRIPTION OF SPECIFIC EMBODIMENTS

Embodiments of the present invention generally relate to nuclear fusion and specifically to systems and methods for using a laser source and a target to achieve nuclear fusion.

As described above, one of the main challenges of achieving nuclear fusion is to bring the nuclei close enough to each other so that they may fuse. The electrostatic force that repels the nuclei from each other is called the Coulomb barrier. The Coulomb barrier is the energy barrier due to electrostatic interaction that two nuclei need to overcome so they can get close enough to undergo nuclear fusion. To overcome this barrier, nuclei have to collide at high velocities. At high velocities, the kinetic energies of the nuclei drive them close enough for the strong interaction to take place and bind them together. The Coulomb barrier is smallest for isotopes of hydrogen as they contain only a single positive charge in the nucleus. For example, using deuterium-tritium (DT) fuel, the resulting Coulomb barrier is about 0.01 MeV. In comparison, the energy needed to remove an electron from hydrogen is 13.6 eV, about 750 times less than the Coulomb barrier energy. Since, temperature is a measure of the average kinetic energy of particles in a gas, by heating the DT gas nuclei they will gain energy and eventually have enough energy to overcome the Coulomb barrier. However, the nuclei will have to be heated to a very high temperature, e.g., in range of about 1000 electron volts to 10,000 electron volts, to achieve fusion.

Figure 1:
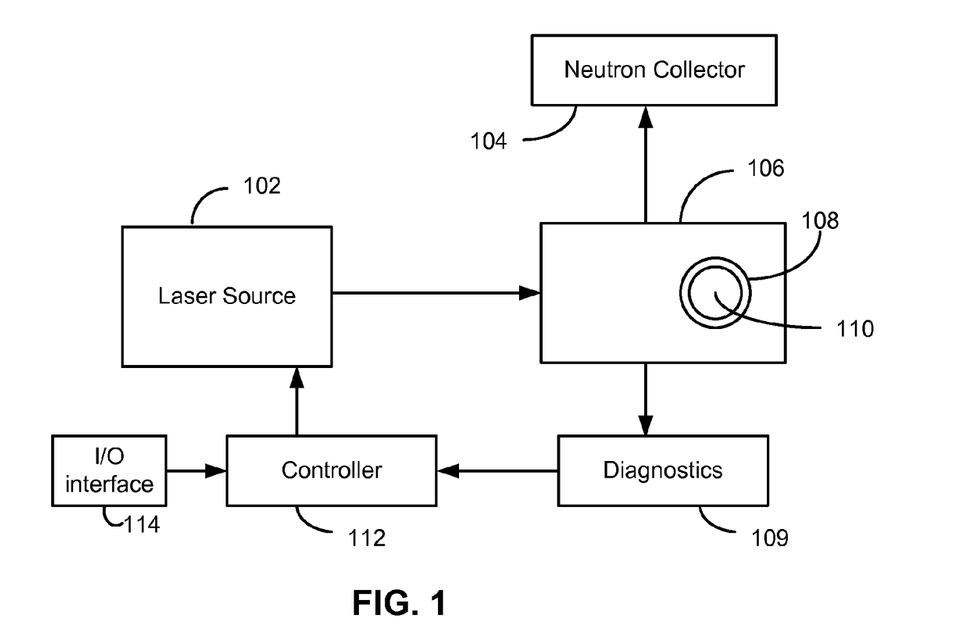
FIG. 1 is a block diagram of a system for achieving fusion according to an embodiment of the present invention.

FIG. 1 is a block diagram of a system 100 that can be used to achieve fusion according to an embodiment of the present invention. In the following description, DT gas will be used as the fuel to explain the method and system for achieving nuclear fusion. However, one skilled in the art will realize that other fuels can also be used to achieve fusion. Examples of other fuels include but are not limited to Deuterium-Deuterium, Deuterium-Helium-3, and Boron-11-Hydrogen. System 100 includes a laser source 102. Laser source 102 can emit a laser beam having an energy of between 12 and 15 kilojoules at power levels of 1 petawatt or higher. In some embodiments, laser source 102 can include Titanium:Sapphire laser. In other embodiments, laser source 102 can include one or more short pulse lasers that are amplified to the petawatt levels using chirp pulse amplification (CPA).

System 100 also includes a target device 106. In some embodiments, target device 106 can include a high-Z material. A high-Z material is a material that has a high atomic number. Examples of high-Z materials include gold, tungsten, lead, silver, etc. One of the properties of a high-Z material is that it can absorb the energy delivered by a high power laser, e.g., a petawatt laser, in a very short distance from the point of incidence of the laser and has the ability to create a large number of hot electrons with high conversion efficiency from light to electrons. For ease of explanation, target 106 is shown as a rectangular, but it is to be understood that other shapes for target 106 are possible. Target 106 includes a capsule 108 embedded in a cavity inside target 106. In some embodiments, capsule 108 can be spherical in shape and comprise DT gas 110. In some embodiments, capsule 108 may be fabricated using a low-Z material such as, silicon dioxide. A low-Z material is a material that has a lower atomic number. Examples of low-Z materials include silicon, beryllium, boron, carbon, etc.

System 100 may also include a controller 112. Controller 112 may be used to control laser source 102. For example, controller 112 may control laser source 102 based on the duty cycle specified for the laser source operation. Controller 112 can be implemented as one or more integrated circuits (e.g., a conventional microprocessor or microcontroller), software or combinations thereof.

Controller 112 may be coupled to an input/output (I/O) interface 114. I/O interface 114 may receive inputs from an external entity, e.g., a user or a computer, and communicate with controller 112 to control laser source 102. For example, I/O interface 114 may receive input indicating the duty cycle at which laser source 102 is to be operated along with other parameters that may be used in the fusion process. In an embodiment, I/O interface 114 can include input controls such as a touch screen, touch pad, scroll wheel, click wheel, dial, button, keypad, microphone, or the like. I/O interface 114 can also include one or more user output devices, such as indicator lights, speakers, headphone jacks or the like, together with supporting electronics (e.g., digital-to-analog or analog-to-digital converters, signal processors or the like).

In some embodiments, system 100 may comprise a neutron collector 104. Neutron collector 104 can be configured to collect the neutrons generated as a result of the fusion reaction occurring within target 106. Neutron collector 104 may comprise a fissile or fissionable material that may be used to generate additional energy. Examples for such materials comprise natural or enriched Uranium or Thorium.

FIG. 1 also illustrates diagnostics 109 that are adapted to measure parameters related to the target device 106 as well as the fusion process. Data from diagnostics 109 is provided to the controller 112 in a feedback loop that enables an operator using I/O interface 114 to control the system. One of ordinary skill in the art would recognize many variations, modifications, and alternatives.

Figure 2:
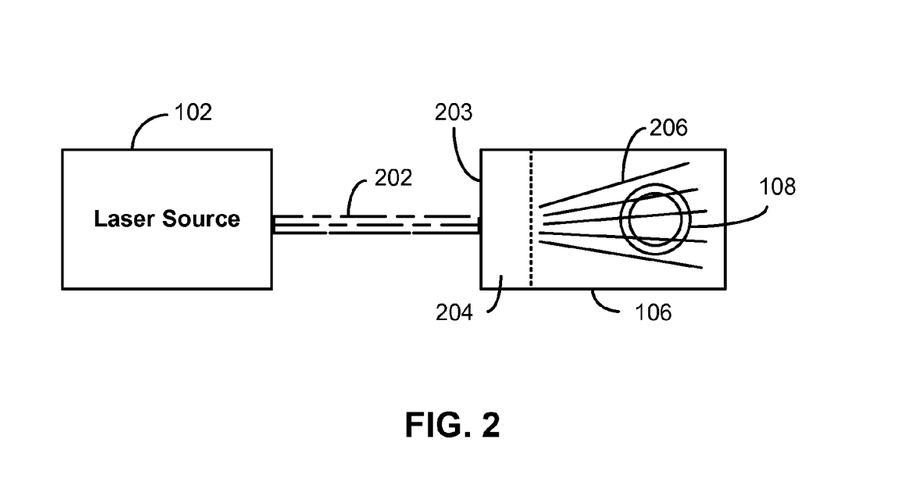
FIG. 2 is a block diagram illustrating the process of achieving fusion according to an embodiment of the present invention.

FIG. 2 illustrates a block diagram of a system 200 for achieving nuclear fusion according to an embodiment of the present invention. System 200 includes a laser source 102 as described above. In some embodiments, laser source 102 generates a laser beam 202 that may have energy of between 12 kilojoules and 15 kilojoules and a beam spot having a diameter of between 50 microns and 100 microns. Laser beam 202 is directed to be incident on a laser incidence surface 203 of a target 106. In some embodiments, laser source 102 is operated in a pulsed mode such that laser beam 202 is incident on laser incidence surface 203 for between 10 femtoseconds to under 20 picoseconds at a time.

In some embodiments, target 106 includes a laser deposition damage region 204. When laser beam 202 is incident on laser incidence surface 203, the material in laser deposition damage region 204 absorbs the energy from the laser beam and is ablated. During the ablation process, laser deposition damage region 204 generates electrons that propagate through target 106. In some embodiments, the depth of laser deposition damage region 204 is between 5 microns and 15 microns. The electrons generated in laser deposition damage region 204 propagate through the target in form of a forward directed electron beam 206. The electrons in electron beam 206 forward transport through the high-Z material of target 106 at a cone angle of approximately ±30 degrees. In some embodiments, the electrons in electron beam 206 have energy of between 1 MeV and 90 MeV and energy of electron beam 206 may be the range of between 2 kilojoules and 3 kilojoules with a current of between 50 mega-amperes and 100 mega-amperes. In some embodiments, laser deposition damage region 204 can include a low-Z material to enable efficient generation and transport of the electrons.

As described above, target 106 includes a capsule 108 that is filled with DT gas. Capsule 108 can be fabricated from low-Z materials. Some of the low-Z materials that can be used to fabricate capsule 108 include silicon dioxide, aluminum oxide, carbon, etc. Capsule 108 is fabricated from a low-Z material so that the capsule walls can absorb the energy from the electrons and heat the capsule and the DT gas inside the capsule. In some embodiments, the capsule may have an outer shell that is multilayered. For example, in some embodiments, where silicon dioxide is used to fabricate capsule 108, it may be advantageous to prevent the oxygen in the silicon dioxide from interacting with the DT gas. In such an instance, a thin layer of beryllium may be used to separate the DT gas and the silicon dioxide layer. In some embodiments, capsule 108 may be spherical. In other embodiments, the capsule can be of different shapes. In the instance where capsule 108 is spherical, it can have a diameter of between 50 microns and 500 microns. In some embodiments, the design of capsule 108 is similar to a fast emission target. In some embodiments, capsule 108 is embedded in a cavity inside target 106 and is located at a distance of between 2 mm and 3 mm from laser deposition damage region 204.

When the laser beam is incident on the target, the area on which the laser beam is incident and the surrounding area absorbs the energy from the laser beam and is heated. The laser deposition damage region generates electrons as a result of the energy absorption from the laser beam and subsequent ionization of the material in the laser deposition damage region. In essence, the laser deposition region is ionized more quickly than is ablated. These electrons travel towards the capsule at close to the speed of light. As the electrons pass through the target, they heat the high-Z material of the target surrounding the capsule, the capsule, and the DT gas inside the capsule. As a result, the high-Z material starts to expand and so does the low-Z material of the capsule. However, the high Z material expands at a faster rate than the low-Z capsule material. As the high-Z material expands it also radiates heat. Due to this, the temperatures of the high-Z material and the low-Z material start to equilibrate. In some embodiments, the equilibrium is achieved at a temp of between 100 electron volts and 1000 electron volts. At the equilibrium temperature, the high-Z material of the target expands more than the low-Z material of the capsule, which in turn expands more than the DT gas. The DT gas also tries to expand but is limited by the expansion of the capsule and expansion of the target material surrounding the capsule. Thus at the same temperature, the pressure exerted by the high-Z target material surrounding the capsule is greater than the pressure exerted by the capsule, which in turn is greater than the pressure exerted by the DT gas. As a result, the high-Z target material surrounding the capsule squeezes the capsule. Since the capsule is also expanding, but cannot expand into the high-Z material, the capsule in turn exerts pressure on the DT gas inside the capsule by compressing the DT gas. At a certain point the pressure on the DT gas is such that the nuclei of the DT gas overcome the Coulomb barrier and fuse together. The entire fusion process occurs isothermally and before any of the ablation in the laser damage deposition region reaches the capsule or the surrounding area.

Figure 3:
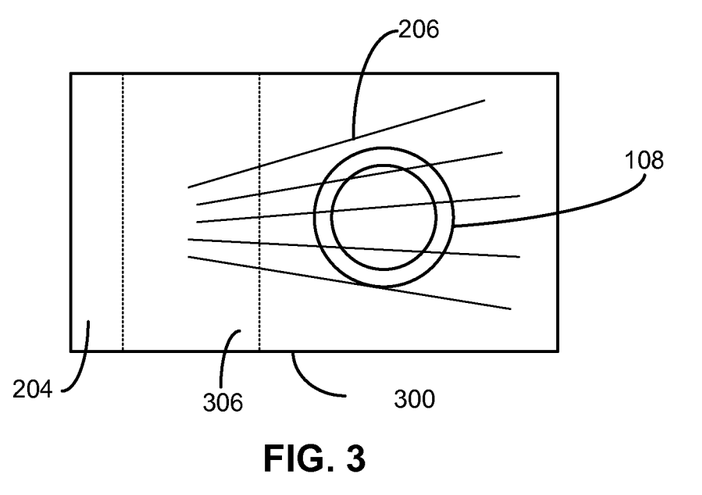
FIG. 3 illustrates a target device according to an embodiment of the present invention.

FIG. 3 shows a target 300 according to an embodiment of the present invention. In this embodiment, target 300 includes an electron generation region 306 disposed adjacent to the laser deposition damage region 204. In some embodiments, electron generation region 306 may be part of laser deposition damage region 204. As described above, a laser beam is directed at the target as part of the fusion process. The laser light gets converted by a ponderomotive force into the forward directed energy of the electrons. This results in ion currents being generated in electron generation region 306 with subsequent creation of an electron beam 206. In some embodiments, electron generation region 306 may include a material that facilitates electron generation by absorbing the energy supplied by the laser beam. In some embodiments, the material in laser deposition region 204 and/or electron generation region 306 can be different from the high-Z material of the target. In some embodiments, electron generation region 306 can be a multilayered region including materials for facilitating electron generation and transport. In some embodiments, the materials for electron generation region 306 can include one or more layers of high-Z materials arranged in a perpendicular or parallel orientation. In another embodiment, a layer of high-Z material is sandwiched between layers of low-Z materials and orientated in a perpendicular or parallel direction.

Figure 4:
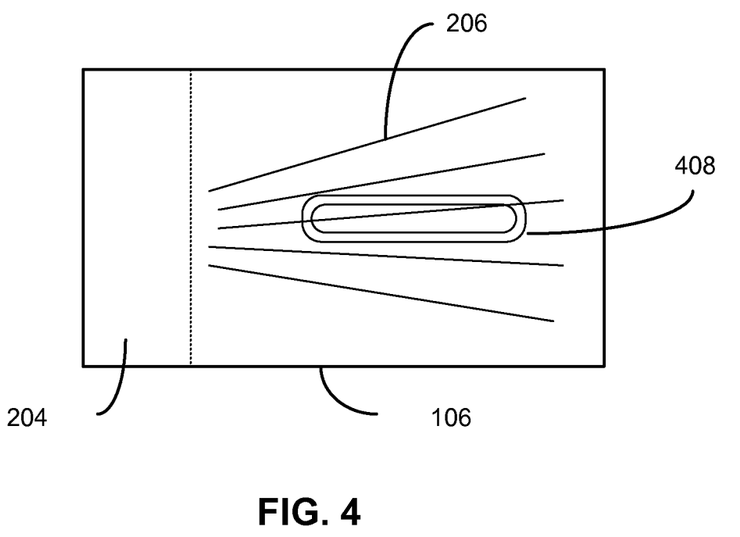
FIG. 4 illustrates a target device according to another embodiment of the present invention.

FIG. 4 shows a capsule 408 that is cylindrical in shape according to another embodiment of the present invention. The cylindrical design may be simpler to fabricate and may help in quicker ignition of the capsule by helping in the generation of a magnetic filed near the capsule.

Figure 5:
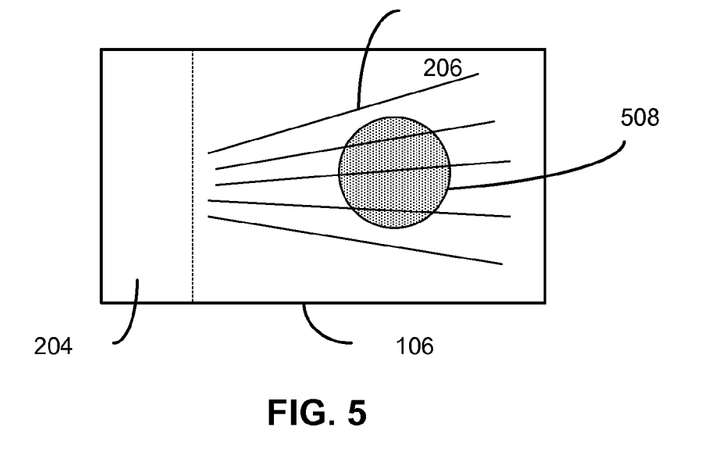
FIG. 5 illustrates a target device according to yet another embodiment of the present invention.

FIG. 5 illustrates a capsule 508 that is fabricated using a porous material, e.g., aerogel according to yet another embodiment of the present invention. When capsule 508 is filled with DT gas, the DT gas bleeds into the pores of the aerogel. When the electron beam heats the capsule, each pore of the aerogel starts to expand thus trapping DT gas within each pore. In essence, the expansion of the material surrounding the capsule concurrently compresses the numerous pores that contain DT gas. There is enough pressure created within each pore to ignite the DT gas. This allows for much efficient ignition of the DT gas, thereby burning more of the DT gas.

Figure 6:
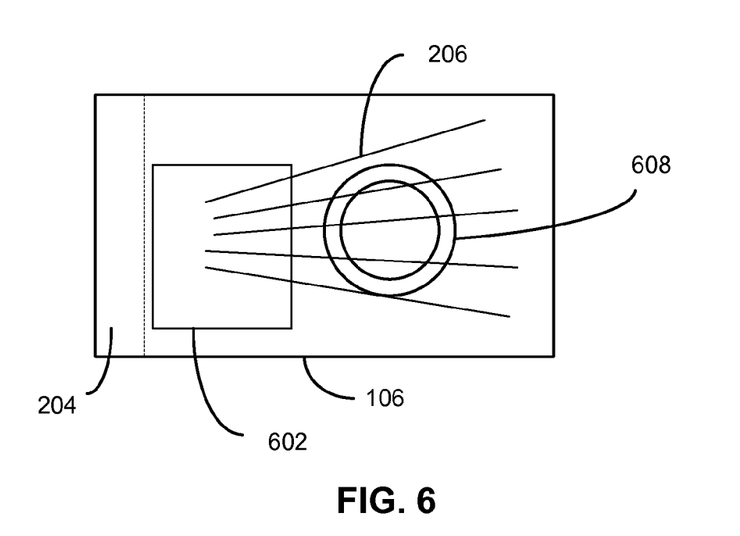
FIG. 6 illustrates a target device according to another embodiment of the present invention.

In some embodiments, when the laser beam is incident on the target, it can generate a shock wave in the target. The shock wave can propagate through the target and towards the capsule. It is desirable that the capsule implosion occur prior to the shock wave reaching the capsule. FIG. 6 illustrates a mechanism to mitigate the shock wave according to an embodiment of the present invention. As illustrated in FIG. 6, a foam structure 602 may be located near the laser deposition damage region 204 to absorb the shock wave or at least slow it down enough to allow the capsule to implode before the shock wave reaches the capsule. In some embodiments, the foam structure 602 can include materials such as, carbon foam, zeolites, aerogels, or other suitable materials with shock mitigating properties.

As described above, the target may be designed to facilitate generation of electrons within the target to promote the fusion process. Similarly, the capsule may also be designed in a manner so as to increase the efficiency and effectiveness of the fusion process.

Figure 7:
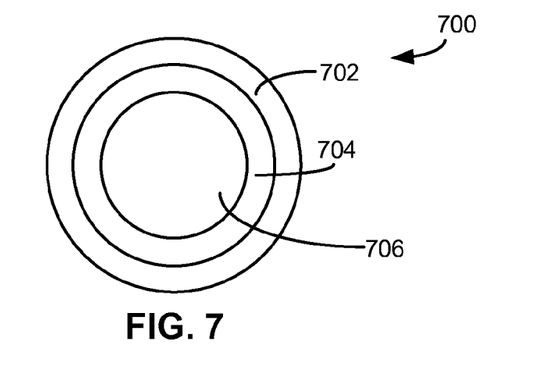
FIG. 7 illustrates a capsule according to an embodiment of the present invention.

FIG. 7 illustrates a capsule 700 according to an embodiment of the present invention. Capsule 700 includes an outer shell 702 and an inner shell 704. In some embodiments, outer shell 702 and inner shell 704 are fabricated using the same material. In other embodiments, outer shell 702 and inner shell 704 may include different materials. For example, the outer shell may include a high-Z material and the inner shell may include a low-Z material. Having the outer shell of a high-Z material may result in a higher compressive force being applied on the inner shell thereby increasing the overall pressure on the DT gas. This may result in speeding up the fusion reaction. In some embodiments, the inner shell and/or the outer shell each may include multiple layers of materials that include high-Z and low-Z materials or combinations thereof. In some embodiments, the materials used to fabricate the outer shell and/or the inner shell may comprise tungsten, iron, aluminum, silicon, beryllium, glass, or hydrocarbon compounds.

Figure 8:
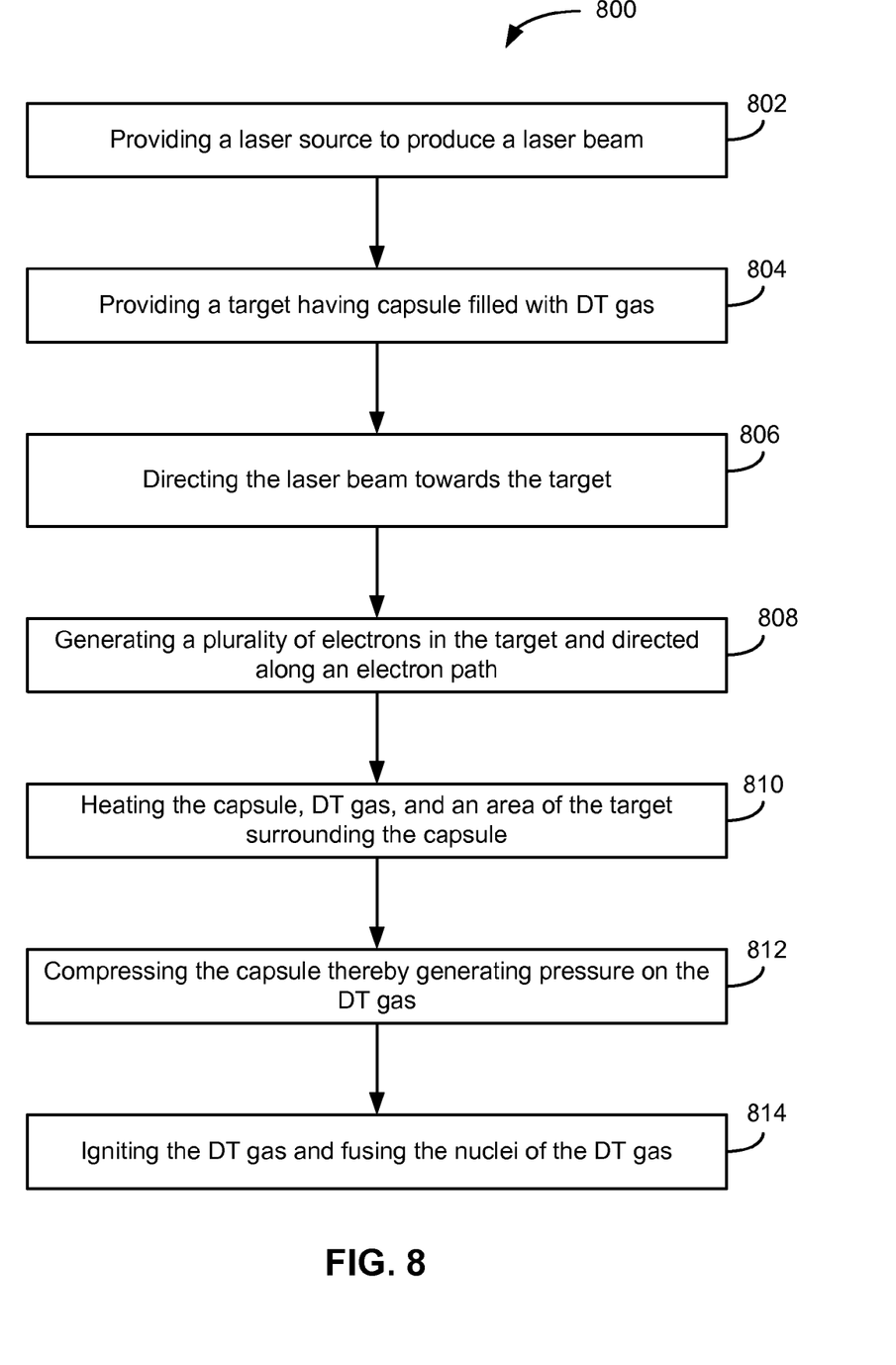
FIG. 8 is a flow diagram of a process for achieving nuclear fusion according to an embodiment of the present invention.

FIG. 8 is a flow diagram of a process 800 for achieving fusion using any of the target embodiments described above according to an embodiment of the present invention. At step 802, a laser source is provided. The laser source is operable to produce a laser beam. At step 804, a target is provided, e.g., target 300 illustrated in FIG. 3. The target has a laser beam incidence region and includes a capsule filled with deuterium-tritium (DT) gas. At step 806, the laser beam generated by the laser source is directed towards the laser incidence region of the target. In some embodiments, the laser beam is incident on the laser incidence area for between 10 femtoseconds and 20 picoseconds during one cycle. As a result of the laser beam being incident on the laser incidence area of the target, an area of the target adjacent to the laser incidence area undergoes ionization due to the absorption of energy from the laser beam. At step 808, a plurality of electrons is generated in the area that undergoes ionization. The generated electrons are then directed along an electron path towards the capsule embedded within the target.

At step 810, as the electrons are travelling through the target, the energy from the electrons heats up the material surrounding the capsule, the capsule itself, and the DT gas inside the capsule. At a certain point, the material surrounding the capsule, the capsule, and the DT gas inside the capsule heat up to the same temperature and begin expanding. At the equilibrium temperature, the material surrounding the capsule expands faster than the capsule, which in turn expands faster than the DT gas. However, since the capsule does not have room to expand due to the pressure being applied by the expanding material in the area surrounding the capsule, the capsule starts expanding by exerting pressure on the DT gas thereby compressing the DT gas, at step 812. At a certain point, the pressure exerted on the DT gas by the imploding capsule and the temperature of the DT gas results in the ignition of the DT gas forcing the DT gas nuclei to fuse at step 814.

It should be appreciated that the specific steps illustrated in FIG. 8 provide a particular method of achieving fusion according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

Although embodiments of the invention have been described using a single laser source that emits a single laser beam, it is to noted that the embodiments are not limited to using one laser source and/or a single laser beam. In some embodiments, multiple laser beams from one or more laser sources can be concurrently incident on the target at various locations on the target surface. An advantage of having multiple beams is that the implosion of the capsule can be achieved in a much shorter time period. Another advantage of using multiple laser beams is that each individual laser beam may not be required to deliver the same amount of energy compared to when using a single laser beam. This may reduce the cost and complexity of the laser source resulting in reduced overall cost of the system. Another advantage of using multiple laser beams is that the capsule can be made larger. A larger capsule may release large amount of energy when the capsule ignites.

Various ideas for achieving controlled fusion in a laboratory setting have been proposed in the past. These include use of lasers, x-rays, ion beams and electron beams to ablatively drive a Deuterium-Tritium (DT) gas filled capsule in an adiabatic compression where the DT gas remains relatively cold and the ablation of the hot capsule surface compresses the cold DT gas to achieve fusion. However, these concepts have not been successfully demonstrated. For instance, in one of the conventional approaches scientists used electron beams to try to achieve fusion. However, it has not been possible to generate an electron beam with enough beam current and density to achieve fusion. Embodiments of the present invention overcome these deficiencies of previous approaches by generating an electron beam with high enough current that can be used to isothermally heat a target to achieve fusion.

Embodiments of the present invention may be used in nuclear fusion systems. Suitable nuclear systems include, but are not limited to, hybrid fusion-fission systems, a Laser Inertial-confinement Fusion Energy (LIFE) engine, hybrid LIFE systems such as a hybrid fusion-fission LIFE system, a generation IV reactor, an integral fast reactor, magnetic confinement fusion energy (MFE) systems, accelerator driven systems and others. In some embodiments, the nuclear system is a hybrid version of the Laser Inertial-confinement Fusion Energy (LIFE) engine, a hybrid fusion-fission LIFE system, such as described in International Patent Application No. PCT/US2008/011335, filed Mar. 30, 2008, titled "Control of a Laser Inertial Confinement Fusion-Fission Power Plant", the disclosure of which is hereby incorporated by reference in its entirety for all purposes.

It should be noted that the examples and embodiments described herein are for illustrative purposes only and that various modifications or changes in light thereof will be suggested to persons skilled in the art and are to be included within the spirit and purview of this application and scope of the appended claims.

What is claimed is:

1. A system comprising:
    a laser source adapted to provide a laser beam directed along an optical path, wherein the laser beam is characterized by an output power in the range of 1 petawatt or higher; and
    a target positioned along the optical path and including:
        a laser incidence area for receiving the laser beam;
        an electron generation region adapted to absorb a portion of the laser energy associated with the laser beam and generate a plurality of electrons along an electron path;
        a compression region disposed along the electron path; and
        a capsule embedded within the compression region and including deuterium tritium (DT) gas.

2. The system of claim 1 wherein the target further includes a shock absorption region disposed between the electron generation region and the compression region, the shock absorption region configured to absorb a shock wave generated by the laser beam.

3. The system of claim 1 wherein the laser source comprises a Titanium Sapphire laser.

4. The system of claim 1 wherein the compression region includes a high Z material comprising one of gold, lead, tungsten, or silver.

5. The system of claim 1 wherein the electron generation region includes a first material and the compression region includes a second material different from the first material.

6. The system of claim 1 wherein the capsule includes an outer shell comprising a low Z material, wherein the low Z material comprises one of silicon dioxide, aluminum oxide, or carbon.

7. The system of claim 6 wherein the outer shell includes a plurality of layers.

8. The system of claim 6 wherein the outer shell comprises a porous material.

9. The system of claim 8 wherein the porous material includes aerogel.

10. The system of claim 1 wherein the capsule is characterized by a diameter of between 50 μm and 100 μm.

11. The system of claim 1 wherein the target further includes an electron transport region disposed along the electron path between the electron generation region and the capsule.

12. The system of claim 11 wherein the electron transport region comprises at least one of a high Z material or a low Z material, wherein the high Z material comprises one of gold, tungsten, lead or silver and the low Z material comprises one of silicon, beryllium, boron, or carbon.

13. A target comprising:
a laser incidence area for receiving a laser beam;
an electron generation region adapted to absorb a portion of laser energy associated with the laser beam and generate a plurality of electrons along an electron path;
a compression region disposed along the electron path, the compression region configured to interact with the plurality of electrons and heat up to a first temperature of between 100 electron volts and 1000 electron volts; and
a capsule embedded within the compression region and including deuterium tritium (DT) gas, wherein the capsule is configured to absorb radiated heat from the compression region and heat up to the first temperature.

14. The target of claim 13 further comprising a shock absorption region disposed between the electron generation region and the compression region, the shock absorption region configured to absorb a shock wave generated by the laser beam.

15. The target of claim 13 wherein the compression region includes a high Z material comprising one of gold, lead, tungsten, or silver.

16. The target of claim 13 wherein the electron generation region includes a first material and the compression region includes a second material different from the first material.

17. The target of claim 13 wherein the capsule includes an outer shell comprising a low Z material and wherein the low Z material includes at least one of silicon dioxide, aluminum oxide, or carbon.

18. The target of claim 17 wherein the outer shell includes a plurality of layers.

19. The target of claim 17 wherein the outer shell comprises a porous material and wherein the porous material includes aerogel.

20. The target of claim 13 further comprising an electron transport region disposed along the electron path between the electron generation region and the capsule, the electron transport region comprising at least one of a high Z material or a low Z material, wherein the high Z material comprises one of gold, tungsten, lead or silver and the low Z material comprises one of silicon, beryllium, boron, or carbon.

* * * * *